United States Patent [19]
Landis et al.

[11] Patent Number: 5,528,749
[45] Date of Patent: Jun. 18, 1996

[54] AUTOMATIC INSTRUMENT TURN OFF/ON FOR ERROR CORRECTION

[75] Inventors: Michael D. Landis, Fishers; Gabriel A. Edde; David M. Browning, both of Indianapolis, all of Ind.

[73] Assignee: Thomson Consumer Electronics, Inc., Indianapolis, Ind.

[21] Appl. No.: 286,472

[22] Filed: Aug. 5, 1994

[51] Int. Cl.⁶ .................................................. G06F 11/34
[52] U.S. Cl. ................. 395/182.21; 364/260.8; 364/DIG. 1
[58] Field of Search .................................. 395/575, 180, 395/181, 182.12, 182.13, 182.2, 182.21, 182.22; 371/16.3, 66, 14, 12; 364/260.8

[56] References Cited

U.S. PATENT DOCUMENTS

| | | | |
|---|---|---|---|
| 4,654,821 | 3/1987 | Lapp | 364/900 |
| 5,345,583 | 9/1994 | Davis | 395/575 |

FOREIGN PATENT DOCUMENTS

| | | | |
|---|---|---|---|
| 0402144 | 12/1990 | European Pat. Off. | G06F 1/26 |
| 102971 | 4/1994 | Japan | G06F 1/30 |

Primary Examiner—Robert W. Beausoliel, Jr.
Assistant Examiner—Albert Décady
Attorney, Agent, or Firm—Joseph S. Tripoli; Peter M. Emanuel; Thomas F. Lenihan

[57] ABSTRACT

To accomplish automatic error correction in an electronics instrument, the instrument includes a controller, coupled to at least one peripheral unit via a communications bus for bidirectional communication with the peripheral unit, coupled to a memory circuit for storing data indicative of the operational status of the peripheral unit, and coupled to a power supply which supplies power to the peripheral unit. The controller reads the operational status data from the peripheral unit and upon detection of an error condition, writes data indicative of status to the memory circuit and causes a removal of power, for a predetermined time, from said peripheral unit, followed by the reapplication of the power. The power supplies themselves are also monitored and, in the event of a detected error in power supply output, the power supply is turned off and turned on in an attempt to clear the problem. In this way, a peripheral unit not having an external reset pin can, nevertheless, be reset by the controller to clear problems caused by transient interference. If the problem persists after a predetermined number of attempts to clear it, the electronics instrument is automatically shut off.

6 Claims, 2 Drawing Sheets

5,528,749

AUTOMATIC INSTRUMENT TURN OFF/ON FOR ERROR CORRECTION

FIELD OF THE INVENTION

The subject invention concerns the bus-controlled television receivers.

BACKGROUND OF THE INVENTION

The design of modern television receivers increasingly involves the use of digitally controlled chips (i.e., integrated circuits) for control of many different functions, such as, picture processing, picture-in picture (PIP) processing, and audio processing. These chips are connected to a controller (which may be a microprocessor, a microcomputer, or a dedicated control IC) via a communications bus. The controller is responsible for writing control parameters to the chips and reading status information from the chips. This process results in a large amount of data being communicated between the controller and its peripheral chips because each of the chips contain programmable registers which must be written to, or read from, to on a periodic basis. Unfortunately, the data stored in these registers are subject to corruption caused by a variety of sources, such as, electrostatic discharge (ESD), radio frequency interference (RFI), high voltage arcing within the picture tube (kine arcs), power supply spikes, etc. It is possible that any of these sources of corruption could cause the instrument to fail to respond to a command (i.e., lock-up) if the controller were waiting for a chip to respond to a request for data. Another result of such corruption is the production of invalid data which is likely to cause unpredictable behavior.

In the computer art it is well-known to use a circuit commonly-known as a watch-dog timer to prevent a specific kind of lock-up, that is, a lock-up in which the microcomputer itself is no longer following its own program instructions due to an incorrect count in its program instruction pointer. A watch-dog timer is a hardware timer with a preset period. If the microcomputer does not return to reset the watch-dog timer before the preset period expires, then an internal reset is initiated to restart the microcomputer at a predetermined program location.

It is also notoriously well-known that many chips include a reset pin for applying a external pulse to force the chips to a known state. Unfortunately, today's chips are quite complex and require many pins (i.e., terminals) for the accomplishment of their particular function. In such chips, pins are at a premium and some manufacturers are reluctant to dedicate a pin to a reset function.

In the automotive electronics art, it is known to monitor various automotive processes and store error codes indicative of discovered problems, as a diagnostic aid to a repair mechanic.

SUMMARY OF THE INVENTION

It is herein recognized that when an error detection and error code storage system is utilized in an electronics instrument to provide data for an electronics repair technician, it is likely to detect errors caused by the corruption noted above, and that such information might be used by the controller in an attempt to "clear" the problem, thus obviating the need for a service call by a repair technician. That is, the status data can be used to identify problems which could possibly be "cleared" by causing the controller to issue a reset command to the affected chips. Unfortunately, as noted above, many of today's chips do not provide any means, such as a reset pin, for receiving an externally generated reset signal.

To accomplish automatic error correction in an electronics instrument, the instrument includes a control means, coupled to at least one peripheral unit via a communications bus for bidirectional communication with said peripheral unit, coupled to a nonvolatile memory means for storing data indicative of the status of said peripheral unit, and coupled to a power supply for supplying power to said peripheral unit.

The control means reads the status data from the peripheral unit and upon detection of an error condition, writes said data indicative of status to said memory means and causes a removal of power for a predetermined time from said peripheral unit, followed by the reapplication of said power. The control means increments a count stored in the memory circuit each time the power is interrupted, and when a predetermined count is reached, the control means causes the instrument to remain in the power off state.

The control means also monitors the power supplies themselves and upon detecting an error in a power supply output, causes the power supply to cycle from power-on through power-off and back to power-on in an attempt to clear the problem.

DETAILED DESCRIPTION OF THE EMBODIMENTS

Figure 1:
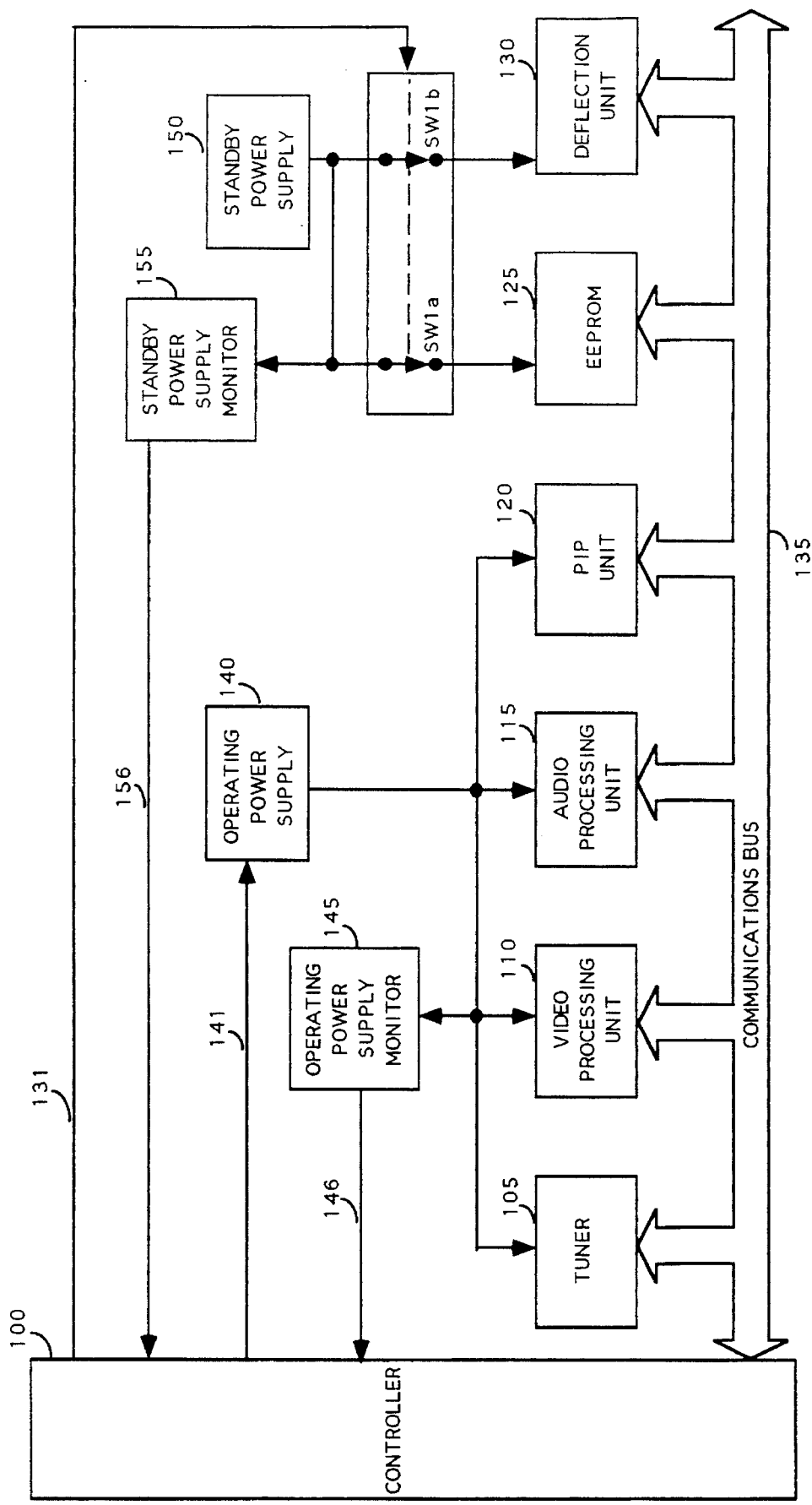
FIG. 1 shows, in block diagram form, an electronic instrument in accordance with the invention.

The electronics instrument of FIG. 1 may be, for example, a television receiver, although the invention is not so limited. The term television receiver, as used herein, includes television receivers having a display screen (commonly called TV sets), and television receivers without a display screen, such as VCRs (videocassette recorders), VCPs (videocassette players), and Videodisc players. The television receiver of FIG. 1 includes Controller 100 communicating with a Tuner 105, a Video Processing Unit 110, an Audio Processing 115, a PIP Unit 120, an EEPROM 125, and a Deflection unit 130, over a Communications Bus 135. Tuner 105, Video Processing Unit 110, Audio Processing Unit 115, and PIP Unit 120 receive power from an Operating Power Supply 140 (sometimes called a Run Power Supply). The output of Operating Power Supply 140 is monitored by an Operating Power Supply Monitor Unit 145 which applies a signal indicating the condition of Operating Power Supply 140 to Controller 100 via a line 146. EEPROM 125 and Deflection Unit 130 receive power from Standby Power Supply 150 via the normally-closed contacts of a Dual Switch SW1a and SW1b operating under control of controller 100 over a control line 131. The use of separate portions of switch SW1 prevents currents from traveling between EEPROM 135 and Deflection Unit 140 which might otherwise hinder the reset effort. Another reason for separate switch portions may be that EEPROM 135 and Deflection Unit 140 might in some instruments be operated from different supply voltages. SW1a and SW1b are shown as mechanical switches for simplicity; one skilled in the art will quickly realize that they are actually electronic switches. The output of Standby Power Supply 150 is monitored by a Standby Power Supply Monitor 155, which applies a signal indicating the condition of Standby Power Supply 150 to Controller 100 via a line 156.

Standby Power Supply 150 produces power supply voltage whenever the receiver is plugged into the AC power line. Note that Operating Power Supply 140 may be turned off and on via a control line 141, but no such control line exists for Standby Power Supply 150. The reason is that Controller 100 is also powered by Standby Power Supply 150, although that power supply line is not shown for simplicity, and therefore Controller 100 would be removing power from itself by turning off the Standby Power Supply. Control line 156 is used to detect failures of the incoming AC power line. That is, if the output of Standby Power Supply 150 begins to go low in response to an AC power line failure, Controller 100 receives a signal over line 156 and responds by storing critical data for an orderly shut down of the receiver. Controller 100 has enough time to store critical data at the onset of an AC power failure because its own power supply line is held up for a short time by a storage capacitor (not shown).

Figure 2:
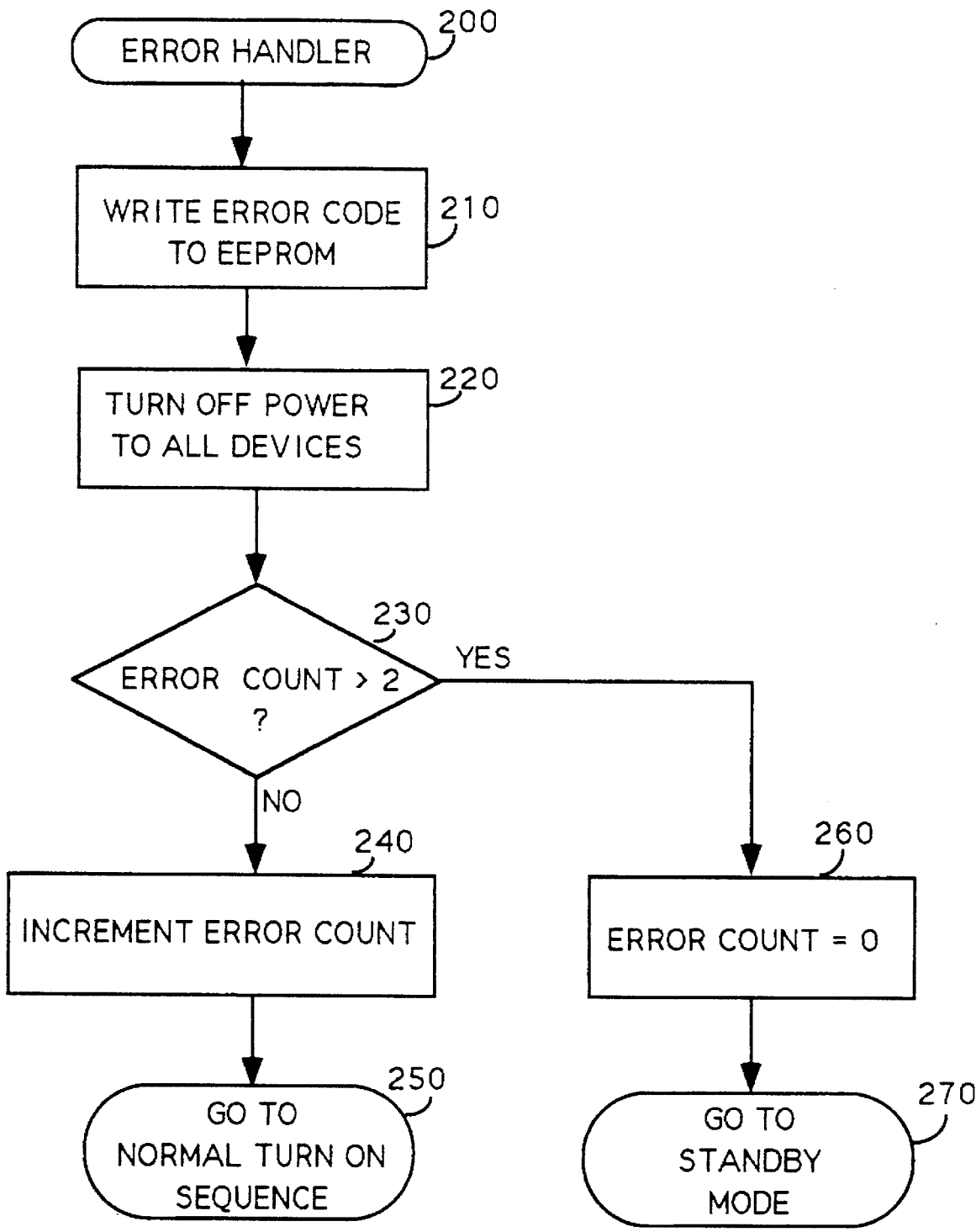
FIG. 2 is a flowchart of a portion of the control program for the controller of FIG. 1.

FIG. 2 is a flowchart of a portion of the control program of controller 100. In operation, each communication to a peripheral device requires an acknowledgment from that device that the communication was received. If no acknowledgment is detected by Controller 100, or if corrupted data is detected, then the routine of FIG. 2 is entered at step 200. A corresponding error code is written to EEPROM 125 at step 210, and action is taken to reset the chips by turning off power to all devices (step 220). At step 230 a determination is made as to whether the error count exceeds a predetermined number (e.g. 2). If the error count does not exceed the predetermined number, then the NO path is taken, the error count is incremented (step 240), and the routine advances to step 250 wherein power is reapplied to all devices via the normal turn on sequence. If the error count at step 230 exceeded the predetermined number, then the YES path is taken to step 260 wherein the error count is reset to zero, and the routine advances to step 270 wherein the receiver remains in standby mode.

As noted above, the output of Operating Power supply 140 is also monitored. An error condition detected in Operating Power Supply 140 will also cause the routine of FIG. 2 to be entered at step 200. The only difference in operation is that a different error code will be stored.

In the above example all detected errors caused a sequence of three reset attempts, followed by a complete shut down of the receiver if the reset attempts were unsuccessful in restoring proper operation of all chips. In the alternative, it is recognized that certain errors may be less than catastrophic, and consequently, after three attempts at resetting the chips, the receiver will not be shut off. Such problems may be somewhat trivial, such as incorrect PIP color, or PIP tint, or audio problems such incorrect bass or treble settings. Thus, a two level classification of detected problems may be set up to determine whether or not the viewer can continue to use the receiver with the problem, or whether the receiver is in such bad condition that it should be shut down entirely.

In the above example, an EEPROM was used to store status data. While such an arrangement may be desirable, it is not a necessary element for apparatus according to the subject invention to detect errors and reset the instrument.

The terms microcontroller, microprocessor, and controller, as used herein, are considered to be equivalent and interchangeable for purposes of the subject invention.

What is claimed is:

1. An electronics instrument, comprising:

a peripheral unit for processing signals;

control means, coupled to said peripheral unit via a communications bus for bidirectional communication with said peripheral unit;

memory means, coupled to said control means, for storing data indicative of the operational status of said peripheral unit; and power supply means, coupled to said control means, and coupled to said peripheral unit for supplying power to said peripheral unit;

said control means determining said operational status data of the peripheral unit via communication over said communications bus, and upon detection of an error condition, writes said data indicative of operational status to said memory circuit;

said control means causing an interruption of power, for a predetermined time, to said peripheral unit, followed by a reapplication of said power to said peripheral unit;

said control means storing in said memory means a count of the number of times in which said power of said instrument was interrupted;

said control means causing said instrument to remain in a power off condition when said count reaches a predetermined number.

2. The electronics instrument of claim 1, wherein said power supply is a source of operating power.

3. The electronics instrument of claim 1, wherein:

said power supply is a source of standby power; and said electronics instrument further comprises a switch having a control input coupled to said control means, said switch having a main conduction path coupled between said source of standby power and said peripheral unit, for conveying standby power to said peripheral unit and for decoupling standby power from said peripheral under control of said control means.

4. The electronics instrument of claim 3, wherein:

said peripheral unit is a deflection signal processing unit.

5. The electronics instrument of claim 1, further including a second peripheral unit, said second peripheral unit also being coupled to said power supply means and to said communications bus; and wherein said controller, upon detection of an error condition of said second peripheral unit causes the storage of said data indicative of operational status of said second peripheral unit, and when said count reaches said predetermined number said control means ceases the operation of causing an interruption of power, for a predetermined time, to said peripheral unit, followed by a reapplication of said power to said second peripheral unit, and does not cause said instrument to remain in a power off condition.

6. An electronics instrument, comprising:

a peripheral unit for processing signals;

control means, coupled to said peripheral unit via a communications bus for bidirectional communication with said peripheral unit; and power supply means, coupled to said control means, and coupled to said peripheral unit for supplying power to said peripheral unit;

said control means determining said operational status data of the peripheral unit via communication over said communications bus;

said control means in response to detection of an error condition causing an interruption of power, for a predetermined time, to said peripheral unit, followed by a reapplication of said power to said peripheral unit;

said control means storing in a memory means a count of the number of times in which said power of said instrument was interrupted;

said control means causing said instrument to remain in a power off condition when said count reaches a predetermined number.

* * * * *